(12) United States Patent
Margaritis

(10) Patent No.: US 9,071,352 B2
(45) Date of Patent: Jun. 30, 2015

(54) FREE SPACE OPTICS ALIGNMENT METHOD AND APPARATUS

(76) Inventor: Georgios Margaritis, Los Altos, CA (US)

( * ) Notice: Subject to any disclaimer, the term of this patent is extended or adjusted under 35 U.S.C. 154(b) by 1738 days.

(21) Appl. No.: 11/379,784

(22) Filed: Apr. 22, 2006

(65) Prior Publication Data

US 2007/0053695 A1   Mar. 8, 2007

Related U.S. Application Data

(60) Provisional application No. 60/714,085, filed on Sep. 2, 2005.

(51) Int. Cl.
*H04B 10/11* (2013.01)
*H04B 10/112* (2013.01)

(52) U.S. Cl.
CPC .................. *H04B 10/1127* (2013.01)

(58) Field of Classification Search
CPC ...................................... H04B 10/11
USPC .................................. 398/118–131
See application file for complete search history.

(56) References Cited

U.S. PATENT DOCUMENTS

| | | | | |
|---|---|---|---|---|
| 5,613,442 A * | 3/1997 | Ahola et al. | ...................... | 104/8 |
| 5,777,768 A * | 7/1998 | Korevaar | ...................... | 398/129 |
| 6,239,888 B1 * | 5/2001 | Willebrand | ...................... | 398/129 |
| 6,335,811 B1 | 1/2002 | Sakanaka | | |
| 6,347,001 B1 * | 2/2002 | Arnold et al. | ...................... | 398/122 |
| 6,381,055 B1 * | 4/2002 | Javitt et al. | ...................... | 398/131 |
| 6,421,627 B1 * | 7/2002 | Ericsson | ...................... | 702/150 |
| 6,462,847 B2 * | 10/2002 | Willebrand | ...................... | 398/139 |
| 6,498,668 B1 * | 12/2002 | Korevaar | ...................... | 398/129 |
| 6,690,888 B1 | 2/2004 | Keller et al. | | |
| 6,775,480 B1 * | 8/2004 | Goodwill | ...................... | 398/158 |
| 6,834,164 B1 | 12/2004 | Chan | | |
| 6,915,080 B2 * | 7/2005 | Heminger et al. | ...................... | 398/129 |

(Continued)

FOREIGN PATENT DOCUMENTS

JP    2005012612 A * 1/2005 ............. H04B 10/10

OTHER PUBLICATIONS http://www.usa.canon.com/html/industrial_canobeam/canobeam/.

(Continued)

*Primary Examiner* — David Payne
*Assistant Examiner* — Tanya Motsinger

(57) ABSTRACT

A novel free space optics transceiver is disclosed comprising at least one light source, at least one photodetector, corresponding positioning means that can independently adjust the position of the light source and the photodetector, and a controller that can send and receive alignment frames conforming to a communications protocol to and from a remote optical transceiver and can use information in the incoming alignment frames from the remote optical transceiver to appropriately adjust the position of the light source and the photodetector thereby maximizing the received power of light signals sent by the remote optical transceiver. Also, an alignment method is disclosed wherein the controller continuously adjusts the positions of the light source and the photodetector until a light signal is acquired from a remote optical transceiver. Then, the incoming alignment information is used to adjust the light source position to achieve bi-directional communication with the remote optical transceiver.

20 Claims, 8 Drawing Sheets

(56) References Cited

U.S. PATENT DOCUMENTS

| | | |
|---|---|---|
| 6,999,685 B1* | 2/2006 | Kawase et al. ............... 398/129 |
| 7,116,911 B2* | 10/2006 | Bloom et al. ................ 398/131 |
| 7,120,363 B2* | 10/2006 | Andreu-von Euw et al. . 398/129 |
| 2002/0005972 A1* | 1/2002 | Bloom et al. ................ 359/172 |
| 2002/0054411 A1* | 5/2002 | Heminger et al. ........... 359/159 |
| 2002/0081060 A1* | 6/2002 | Margalit et al. ............... 385/18 |
| 2002/0149811 A1* | 10/2002 | Willebrand .................. 359/110 |
| 2003/0035445 A1* | 2/2003 | Choi ............................ 370/535 |
| 2003/0081294 A1* | 5/2003 | Lee .............................. 359/172 |
| 2004/0022537 A1* | 2/2004 | Mecherle et al. .............. 398/41 |
| 2004/0141753 A1* | 7/2004 | Andreu-von Euw et al. . 398/122 |
| 2004/0141754 A1* | 7/2004 | Cheng et al. ................. 398/122 |
| 2005/0141897 A1* | 6/2005 | Takahashi et al. ............ 398/118 |

OTHER PUBLICATIONS http://www.usa.canon.com/html/industrial_canobeam/canobeam/autotrack.html.

* cited by examiner

FREE SPACE OPTICS ALIGNMENT METHOD AND APPARATUS

This application claims the benefit of U.S. Provisional Application No. 60/714,085, filed on Sep. 2, 2005.

FIELD OF THE INVENTION

The present invention relates to the field of free space optical communications systems and to techniques for aligning two free-space optical communication systems.

BACKGROUND OF THE INVENTION

In free space optics a first optical transceiver sends and receives optical signals from a second optical transceiver through free space. Alignment of the two optical transceivers is crucial for error free transmission of the signals exchanged between the two optical transceivers. In Prior Art, the optical transceivers are mounted on rotational stages than can rotate about horizontal and vertical axes. The initial alignment between the optical transceivers is done by operators adjusting the vertical and horizontal angles of the optical transceivers until a signal is detected by both optical transceivers, and then the signal is maximized by fine adjustments. After alignment, the optical transceivers are left at either a fixed position, or there is an active tracking mechanism to adjust their vertical and horizontal angles to maintain signal strength.

However, this alignment method has several issues. First, it requires initially well trained operators to install the optical transceivers, and secondly, after initial alignment, if the optical transceivers become miss-aligned, manual intervention to re-align them may be needed. Further, even if the optical transceivers are aligned, optical aberrations due to weather conditions or aging of the optical or mechanical components of the optical transceivers can lead to improper focusing of the incoming beams, thus leading to errors in the transmission.

SUMMARY OF THE INVENTION

In this invention a novel free space optics apparatus and alignment method are disclosed to eliminate the issues related to prior art alignment methods and apparatuses. Specifically, a light source and a photodetector are mounted on corresponding support bases that can independently position the light source and photodetector, thereby decoupling light emission from light detection and allowing maximum flexibility in aligning two optical transceivers to each other. Further an alignment method implemented by the free space apparatus of this invention is disclosed wherein a controller continuously transmits alignment information into free space and simultaneously adjusts the positions of the light source and the photodetector until a light signal is acquired from a remote optical transceiver. Then, the incoming alignment information from the remote optical transceiver is used to adjust the light source position to achieve bi-directional communication with the remote optical transceiver.

LIST OF FIGURES

DESCRIPTION OF THE INVENTION

Figures 1A, 1B, 1C:
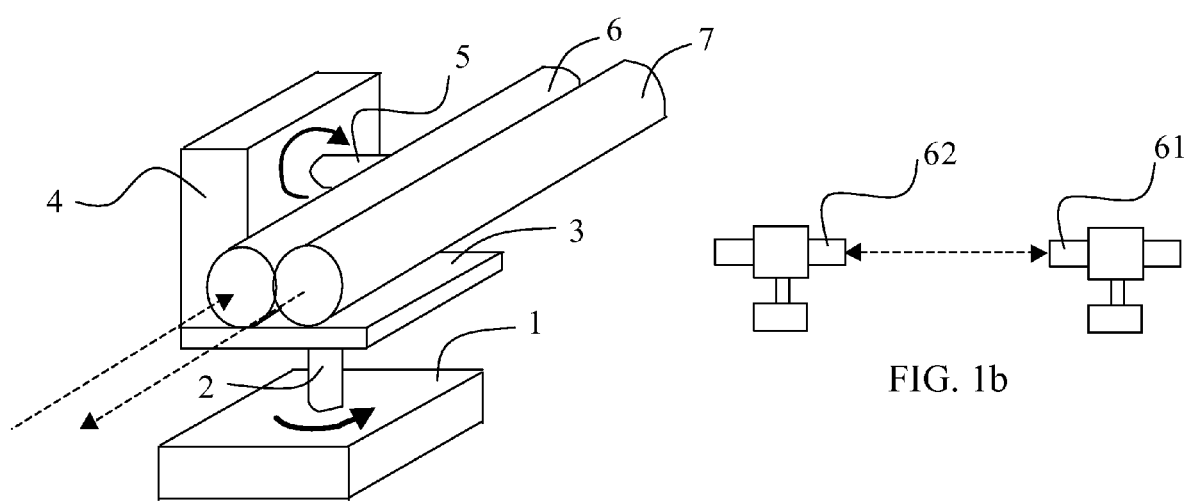
FIG. 1a shows one embodiment of the optical transceiver of this invention.
FIG. 1b is a schematic diagram depicting proper alignment of two optical transceivers.
FIG. 1c is a schematic diagram depicting improper alignment of two optical transceivers.

FIG. 1a shows one embodiment of the optical transceiver of this invention. It includes a servo motor 1, such as a Futaba FUTM0255, with its shaft 2 attached to a plate 3. A second servomotor 4, such as a Futaba FUTM0255, is attached to the plate 3 and its shaft 5 is attached to a tube 6. Tube 6 is attached to a second tube 7. Servomotor 1 rotates tubes 6 and 7 about the vertical axis defined by shaft 2, and servomotor 4 rotates tubes 6 and 7 about the horizontal axis defined by shaft 5. In general the servomotors and tubes form a support base with at least two degrees of freedom to support the optical and electronic components of this invention.

FIG. 1b shows proper alignment between two optical transceivers 61 and 62, to achieve error free transmission. Both optical transceivers have the same construction, as described in this invention.

Figure 2A:
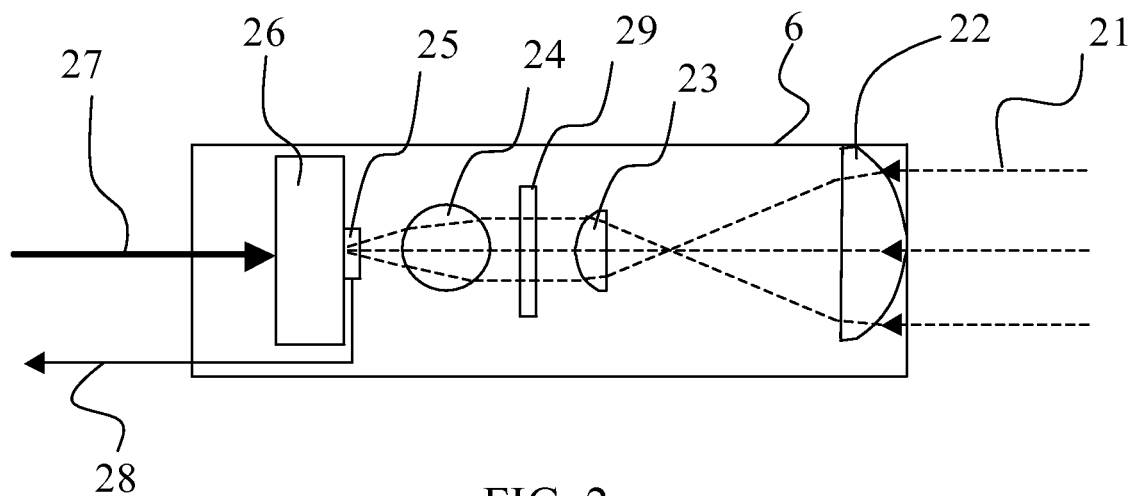
FIG. 2a shows one embodiment of the receive optical elements of the optical transceiver of this invention.

FIG. 2a shows one embodiment of the receive optics of the optical transceiver of this invention. It includes a lens 22, such as a plano-convex lens from Thorlabs, attached to the front end of tube 6. A system of lenses 23 (plano-convex) and 24 (ball lens), along with lens 22 focus an incoming laser beam 21 onto a photodetector 25, such as a Fermionics FD100S2. Several lens vendors offer lenses that can be used in this invention, such as those from Thorlabs or Edmund Optics. The photodetector 25 is attached to a motorized X-Y-Z stage 26, such as a set of three MX80L Parker Daedal stages in an X-Y-Z configuration with an associated driver such as a ViX driver. In general, numerous stages, motors and controllers are available from multiple vendors to accomplish this task, such as stages from Newport, motors from Sanyo-Denki, motor drivers from Allegromicro. A removable band-pass optical filter 29, such as an Edmund Optics DWDM dielectric band-pass filter, is also used in the optical path to allow only predetermined optical wavelengths to pass through.

Figure 2B:
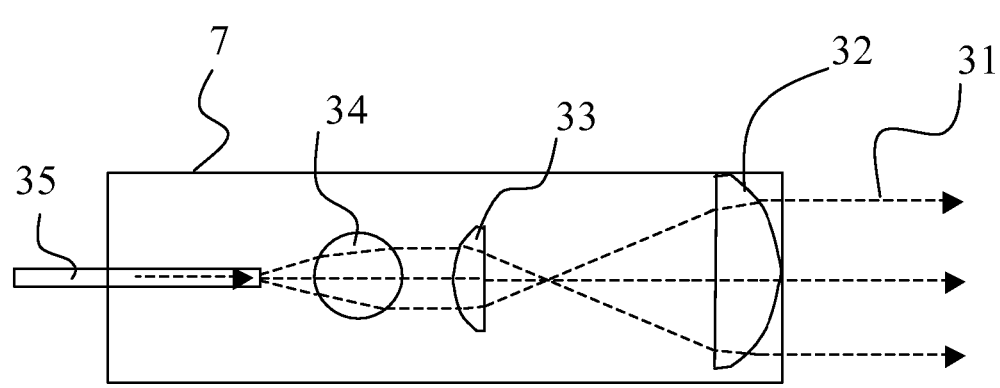
FIG. 2b shows one embodiment of the transmit optical elements of the optical transceiver of this invention.

FIG. 2b shows one embodiment of the transmit optics of the optical transceiver of this invention. It includes an optical fiber 35 entering one end of tube 7. A system of lenses 34, 33 and 32 expands the laser beam carried by the fiber and emits it into free space 31.

Figure 3:
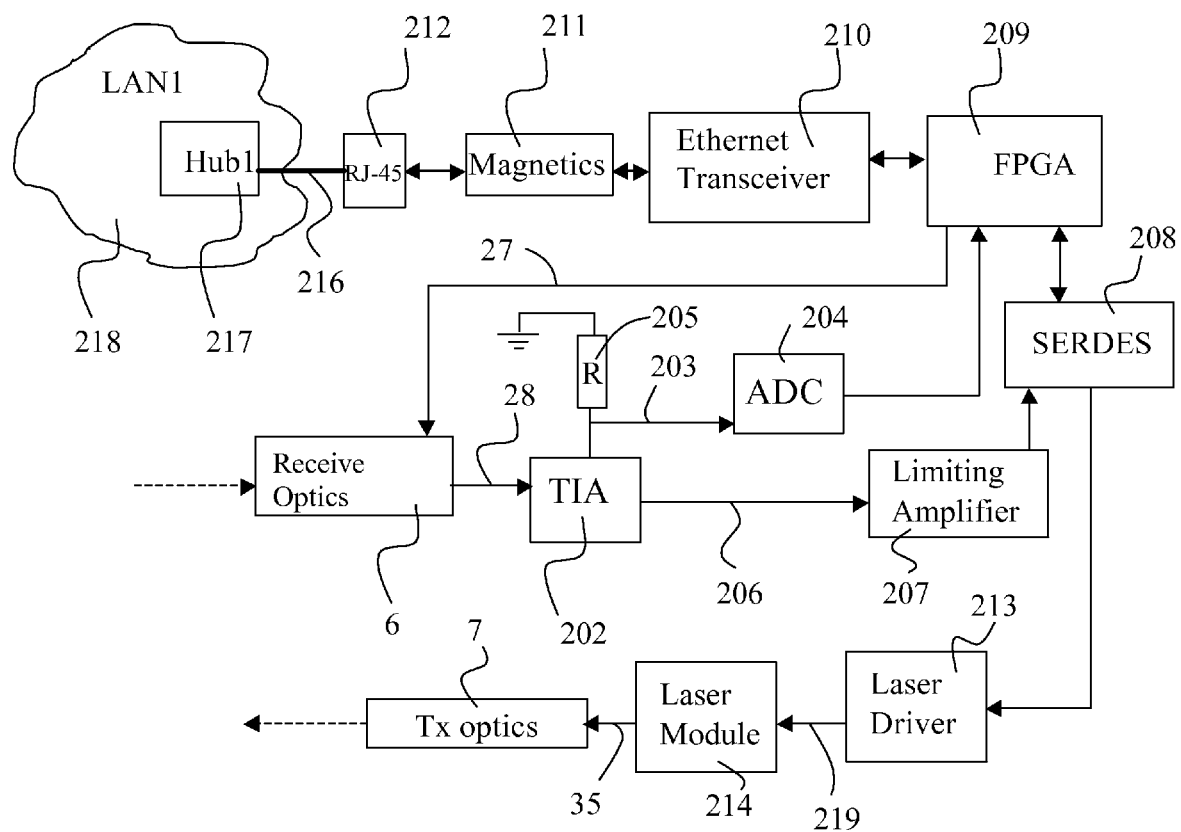
FIG. 3 shows one embodiment of the electronic elements of the optical transceiver of this invention.

FIG. 3 shows one embodiment of the electronic components of this invention The output 28 of the photodetector 25 of FIG. 2a is input into a transimpedance amplifier (TIA) 202, such as a Maxim MAX3793. The TIA 202 has a differential output 206 that is input into a limiting amplifier 207, such as a Maxim MAX3265, and a photodiode average current output 203 that is converted to voltage by means of a resistor 205 and is input into an analog to digital converter (ADC) 204, such a National Semiconductor ADC0801. The output of the ADC 204 is input into a field programmable gate array (FPGA) 209, such as a Xilinx Virtex FPGA.

Figure 4:
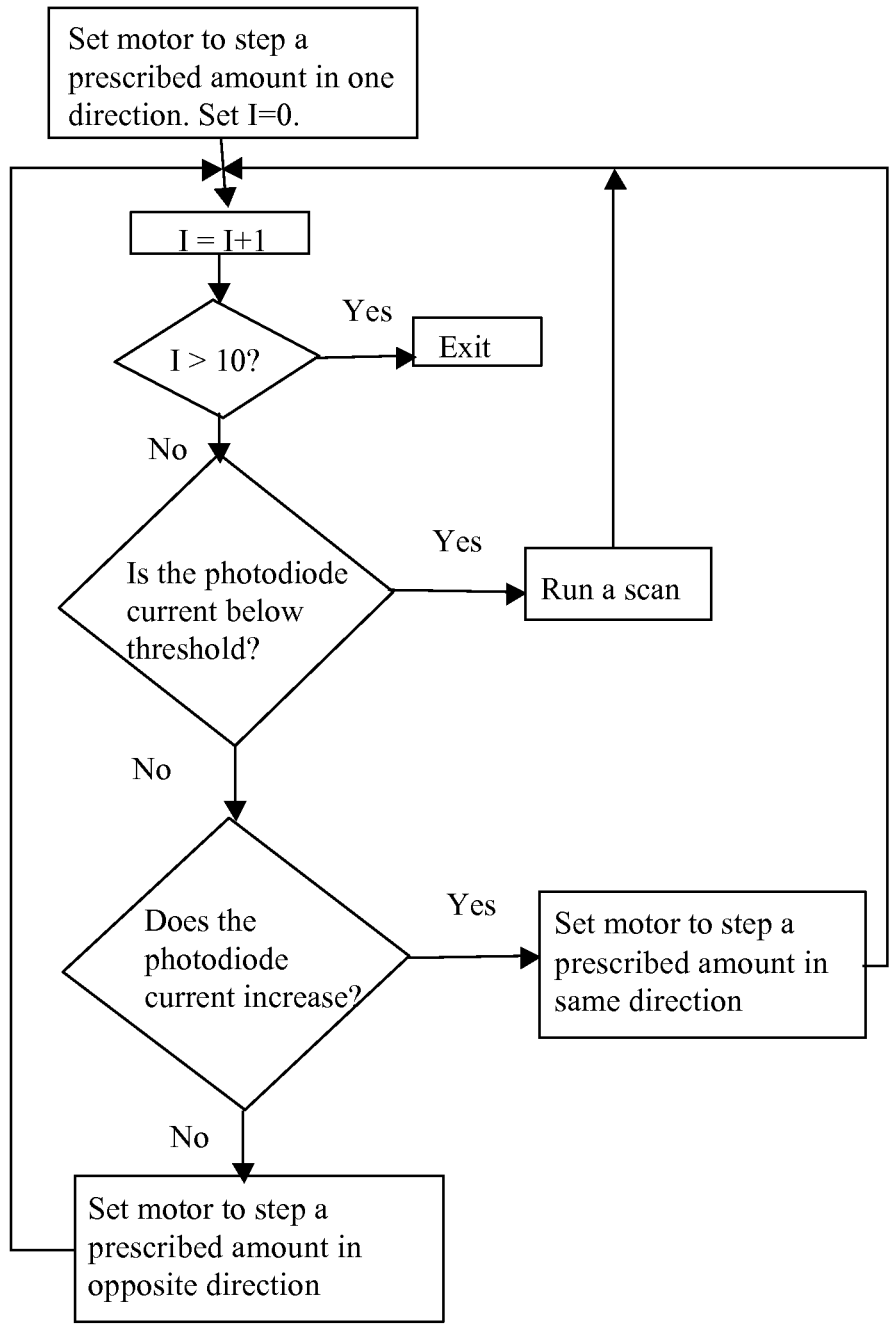
FIG. 4 shows a block diagram of one embodiment of the motor control algorithm implemented by the optical transceiver of this invention.

The FPGA 209 receives the output of the ADC 204, and generates control signals 27 that drive the servo motors 1 and 4, and the motors of the X-Y-Z stage 26, to maximize the photodiode current 203. The FPGA can either implement a Verilog code, or have an embedded CPU that executes instructions to generate the appropriate motor control signals. There are several Prior Art techniques for controlling a set of servomotors to maximize a feedback variable. For example, the FPGA controls each servomotor sequentially. Referring to FIG. 4, for each servomotor, it sets the motor to step a prescribed amount (angle for conventional servomotors and distance for linear servomotors). If the photodiode current increases it continues stepping the motor in the same direction, otherwise it reverses direction. The feedback loop can be repeated a number of times (e.g. 10) before the currently controlled servomotor is fixed at its optimized position and the next servomotor is then actively being controlled. If at any time the photodiode current drops below a certain threshold level (i.e. signal is lost), a complete scan is performed to find the signal.

A complete scan is done by positioning all 5 servo motors 1, 4 and the motors of the X-Y-Z stage 26 through all their predetermined positions and finding the position that maximizes the photodiode current 203. For example, if each servomotor is allowed to have 10 discrete positions then there are 100,000 distinct positions for all five servomotors. In general, the position of each servomotor can be adjusted in a few milliseconds, and therefore the entire scan will take several minutes. In general, the rate at which each servomotor is stepped from one position to the next can be adjusted. Also, two optical transceivers that attempt to communicate with each other can have different scan rates.

Further in FIG. 3, the limiting amplifier 207 is connected to a Serializer/Deserializer transceiver IC (SERDES) 208, such as a Texas Instruments TLK. The SERDES 208 is connected to the FPGA 209. The FPGA 209 is connected to a Gigabit Ethernet transceiver IC 210, such as a National Semiconductor DP83865DVH. The Gigabit Ethernet transceiver IC 210 is connected to a set of four isolation transformers 211, one for each channel of the 1000 Base-T signal, such as four Pulse H-5007, which in turn are connected to a RJ-45 connector 212. The SERDES 208 is also connected to a laser driver 213, such as a Maxim MAX3273 that drives a single mode laser module 214, such as a Sumitomo SLT4460. The fiber 35 is connected at one end to the output of the laser module 214 and coupled at the other end to the transmit optics 7.

Figure 5:
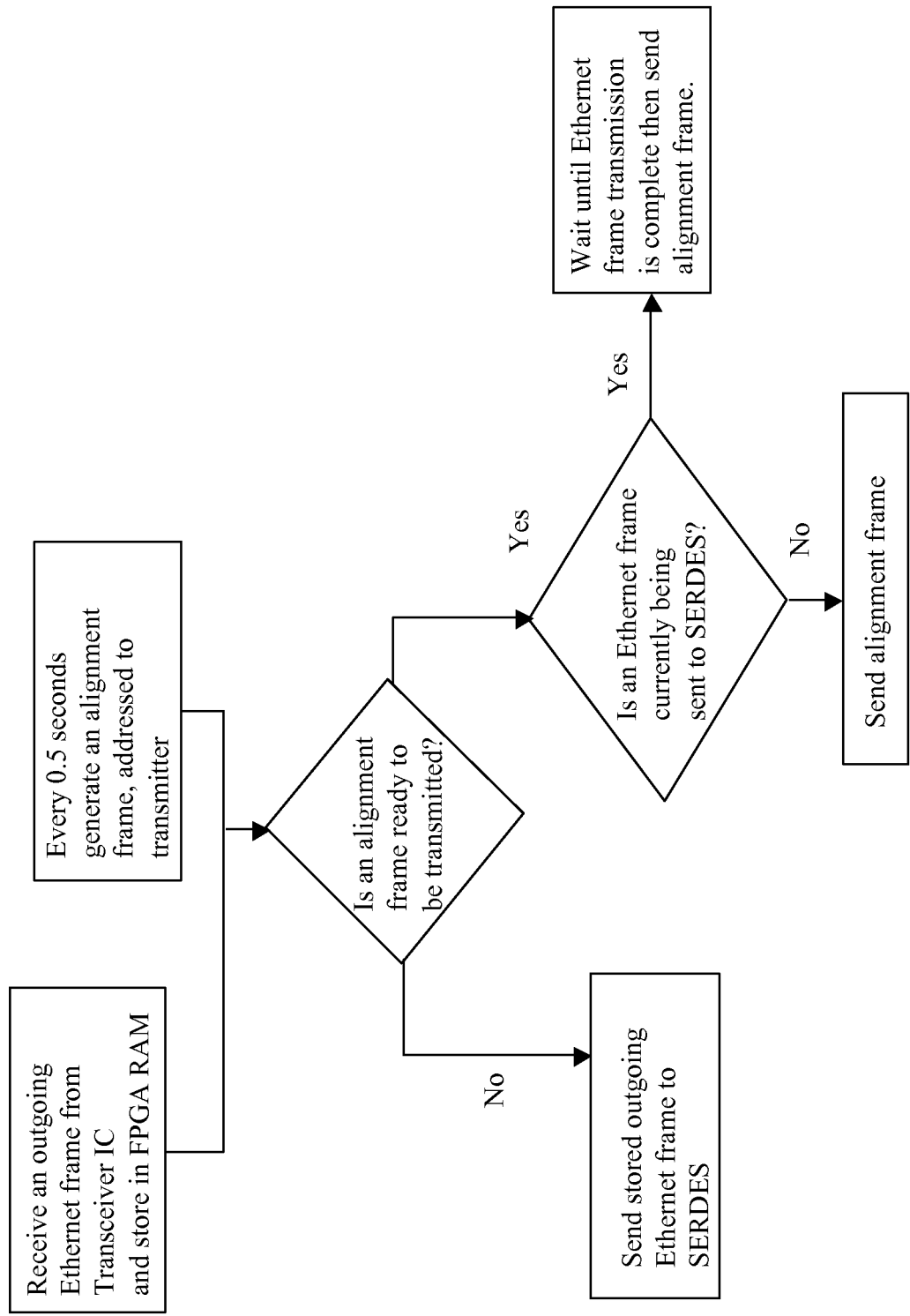
FIG. 5 shows a block diagram of one embodiment of a Verilog program implemented by the optical transceiver of this invention to prioritize transmission of alignment and data frames to a remote optical transceiver.
Figure 7:
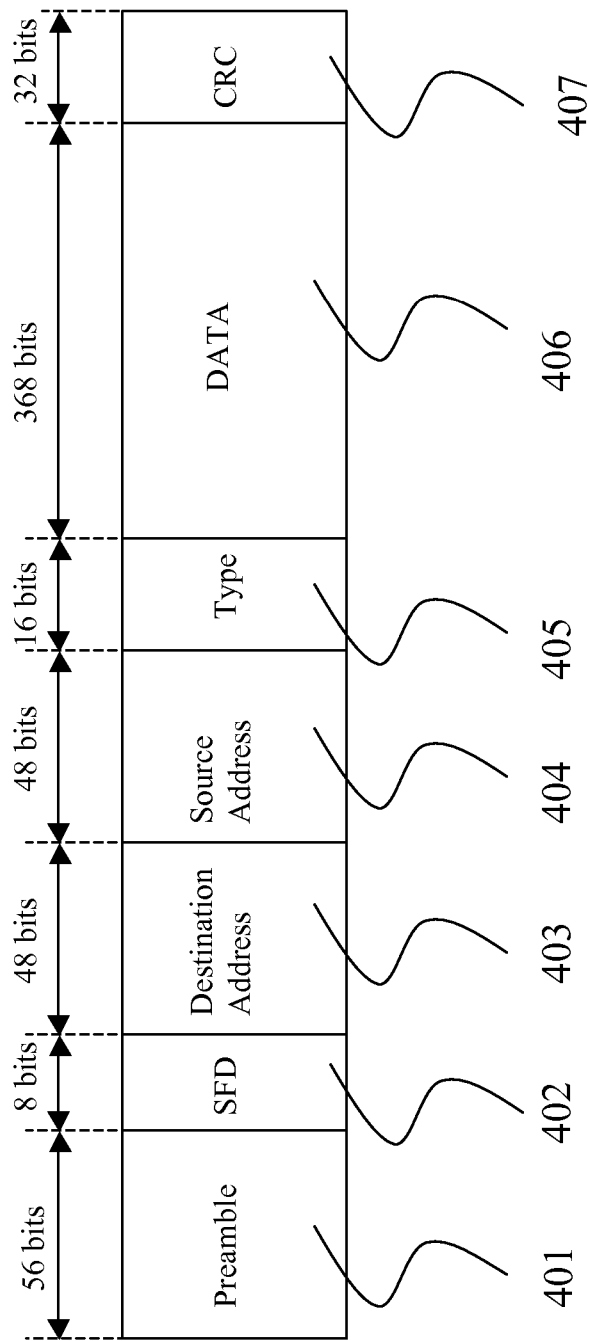
FIG. 7 shows the fields of an alignment frame of this invention.

The FPGA 209 implements a Verilog program shown in a high-level block diagram form in FIG. 5 to transmit frames to the other optical transceiver. By implementing this program the FPGA accomplishes a number of functions in parallel. First, it generates an alignment frame every 0.5 seconds (the time could be adjusted to any other appropriate value). Referring to FIG. 7, the timing frame has a preamble field 401 of 56 bits of alternating 1's and 0's, identical to those of an Ethernet frame. It has a Start Frame delimiter field 402 of 8 bits, 10101011, again identical to those of an Ethernet frame. It has a destination address field 403 of 48 bits. This address is a local address recognized only by the two optical transceivers. For example, the first optical transceiver 61 of FIG. 1b, can have address 1 (that is the first 47 bits of the destination Address field are 0 and the last bit is 1), and the second optical transceiver 62 of FIG. 1b can have address 2 (that is the first 46 bits of the destination address field are 0 and the last two bits are 1 and 0). The Source address field 404 contains the address of the source optical transceiver. All bits of the type field 405 are zero, and the first 8 bits of the data field 406 contain the digital value of the photodiode average current value 203 as determined by the ADC 204. The next 8 bits of the alignment frame contain the photodiode average current value of the other optical transceiver, if an alignment frame sent by the other optical transceiver 62 was received. The remainder of the fields 404 to 307 of the alignment frame have the value zero (that is all bits are 0). In parallel, the FPGA 209, receives and stores in its RAM frames received from the Ethernet transceiver 210. It sends these frames to SERDES 208, when an alignment frame is not being transmitted.

By implementing this Verilog program, each optical transceiver sends periodically status information to the other optical transceiver, such as the value of the photodiode current they measure, which is the strength of the received signal. This status information can be used by each optical transceiver in a feedback loop, for example the feedback algorithm shown in FIG. 4 to control their position and thus achieve or optimize their alignment.

Figure 6:
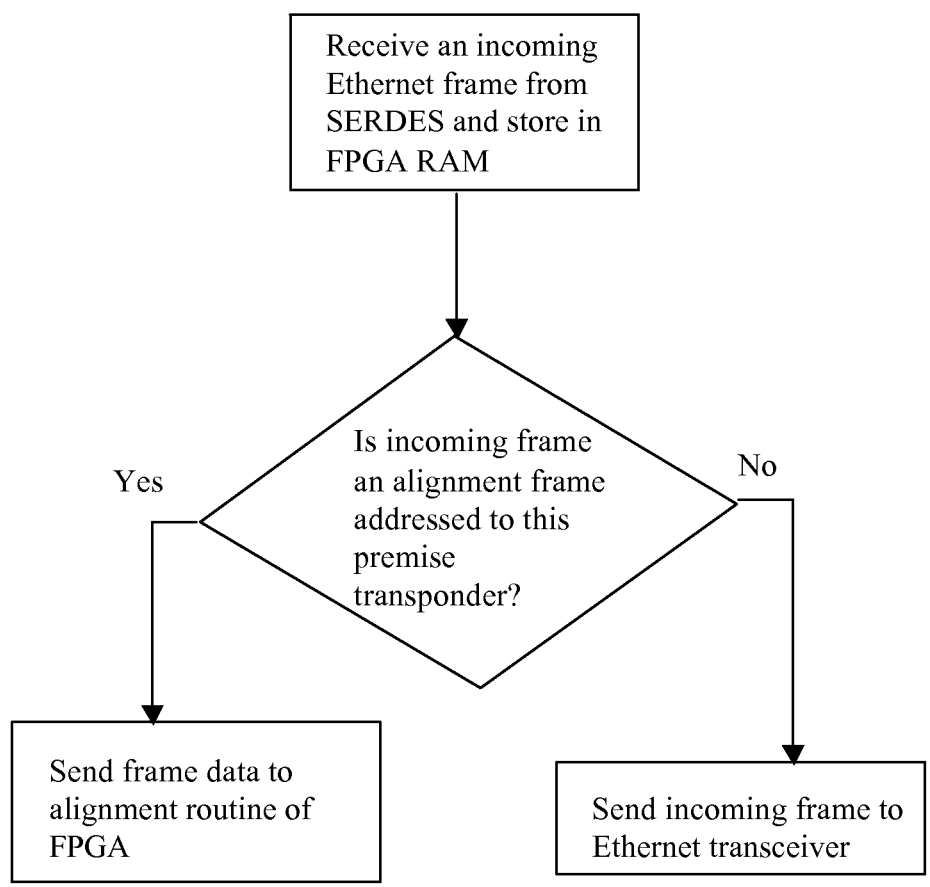
FIG. 6 shows a block diagram of one embodiment of a Verilog program implemented by the optical transceiver of this invention to process incoming alignment frames from a remote optical transceiver.

The FPGA 209 also implements a Verilog program shown in a high-level block diagram form in FIG. 6 to process incoming frames from the other optical transceiver. Each optical transceiver receives frames from the other optical transceiver and determines if the incoming frame is an Ethernet frame or alignment frame, by examining the fields of the frame. If the incoming frame is an Ethernet frame it is forwarded to the Local Area Network 218 of FIG. 3. If it is an alignment frame it is used by the FPGA 209 to adjust the position of the optical transceiver and thus optimize alignment.

Numerous other embodiments of the present invention are also possible. For example, although this embodiment uses a 1000Base-T connection to the switching hub of the base station, many other connections of different speeds or connection media are possible, such as 10-BaseT, or 100-BaseTX, or 1000Base-T connections, that use electrical interfaces, or 1000Base-X, or 10Gibabit/s connections using optical interfaces. Further, in other embodiments, the data frames could be in the form of SONET or ATM frames or any other type of data units or frames transmitted through a network.

Also, the data field 406 of the alignment frame can include information about the position of the motors of the optical transceiver that sends the alignment frame and the position of the motors of the second optical transceiver, as present in the last received incoming alignment frame. In servomotors, the angular position of their shaft is determined by the width of a pulse sent to their signal wire by the motor controller, the FPGA 209 in this embodiment. Therefore, the alignment frame may include the width of the control pulses sent to each servomotor by the controller in some pre-determined order. For example, the data field of the alignment frame can include the width of the pulse sent to servo motor 1, followed by the width of the pulse sent to servo motor 4, followed by the value of the control signals sent to the motors of the X-Y-Z stage 26, followed by the data present in the last alignment frame received. In general, any type of information available to the optical transceiver can be included in the alignment frame. Also such frames can be requested by and sent to the other optical transceiver or requested by and sent to any other device in the network to which the optical transceiver is connected.

Also, the photodetector 25 could be replaced or supplemented by a multi-element detector, such as a PSD1 quadrant detector from Thorlabs, that also provides positioning information. In such embodiment, the photocurrent values for each photodetector quadrant will be included in the alignment frame in a specific order, such as top quadrant first followed by the other quadrants in a clockwise direction. The photodetector quadrant values are use by the second optical transceiver to adjust the transmit optics position, thus optimizing alignment between the two optical transceivers 61 and 62. This is done by rotating the transmit optics tube 7 by a small amount, e.g. 0.1 degrees, in the direction of the quadrants with the lowest photocurrent values.

Also, the receive and transmit optics can be replaced by a different lens or system of lenses or mirrors (singlets, doublets, parabolic reflectors) that accomplish the same functions. In the simplest case, a single lens can focus incoming light onto the photodetector, or expand the beam carried by the fiber. Also, the servomotors can be replaced by numerous other types of motors, such as stepper motors, and controllers. Further, in other embodiments, motor control can be supplemented with or substituted by manual control of the rotation of the shafts 2 and 5 and/or the position of the X-Y-Z stage 26. This can be done, for example, by adding hand cranks and micrometers. In general, numerous prior art methods exist to control the angular and linear motion of shafts and stages, as for example the manual or motorized swivel bases found in camera tripods.

Also, the FPGA 209 could be replaced by an application specific IC (ASIC) or by a DSP or CPU programmed to perform the functions of the FPGA. Also, the SERDES 208 could be replaced by a transceiver IC, such as, for example, an Intel LXT971 for 100 Mbits/s transmissions. Many combinations of the above are also possible. Also, the Ethernet transceiver IC 210 could be replaced by an Ethernet controller IC, such as an Intel 82540EM Gigabit Ethernet controller, and the connection to FPGA 209 could be done by a PCI bus. Other controllers and bus types could also be used. Also, the Ethernet transceiver functions could be integrated in the FPGA.

In another embodiment of this invention, a multi-channel radio receiver, such as a Futaba R156F, can be attached to the optical transceiver. The radio receiver is connected to the servomotors 1 and 4. An operator can remotely then control the position of the optical transceivers, by using a radio controller, such as a Futaba 6FGK FM. In this manner, an operator can align the optical transceivers remotely, during initial installation or if alignment is lost. Alternatively, the radio receiver signals can be input into the FPGA, and control of the motors can be accomplished through the FPGA. A visible light source, such as a laser diode, can also be mounted onto the optical transceivers to assist the operator in aligning the devices.

Figure 8:
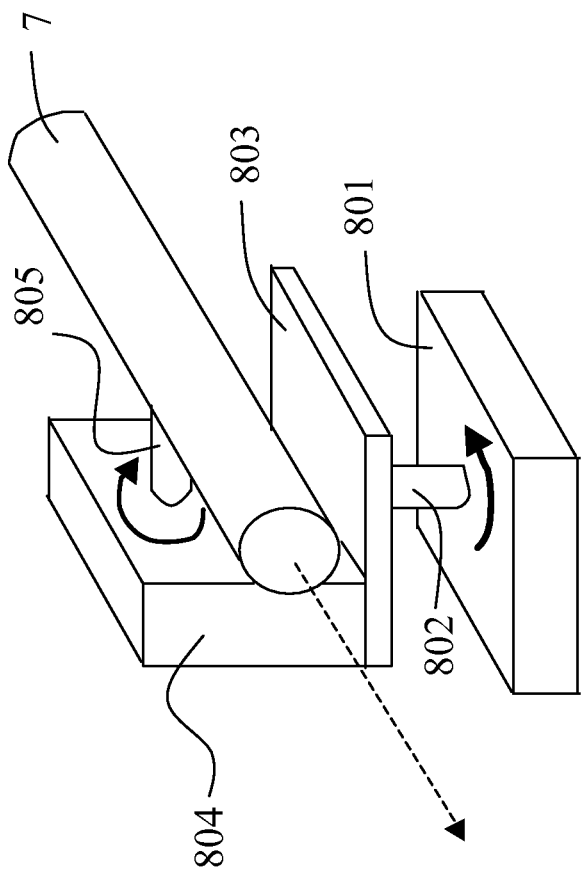
FIG. 8 shows an alternative motorized mounting support for the transmit optics of this invention.

In another embodiment of this invention, and referring to FIG. 8, the transmit optics tube 7 is mounted onto the shaft 805 of a servomotor 804. Servomotor 804 is mounted onto the shaft 802 of servomotor 801. The servomotor 801 is attached to the receive optics tube 6 of FIG. 1. There are numerous prior art methods of attaching mechanical components and motors together, such as using mounting brackets and screws, welding and so on. In this embodiment, the transmit optics tube 7 can have additional degrees of freedom than those allowed by the arrangement of FIG. 1. In other embodiments tube 6 could also be mounted on one or more servomotors similarly to tube 7. Also in this invention, tubes 6 and 7 could be substituted by any platform capable of supporting the receive and transmit optics respectively, such as plates of various shapes and sizes or any other appropriate combination of mechanical parts.

Figure 9:
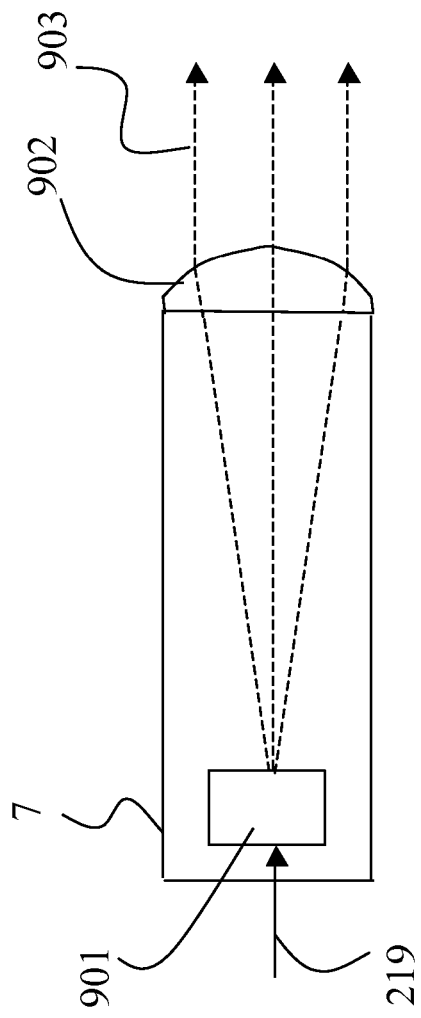
FIG. 9 shows an alternative configuration for the transmit optics of this invention.

In another embodiment, the laser module 214 and transmit optics 215 of FIG. 3 can be replaced by a free space laser diode 901 of FIG. 9, such as a Mitsubishi ML925B6F diode, mounted inside tube 7, that emits a free space laser beam 903 that is collimated by a plano-convex lens 902. Also, the laser diode could be mounted on a linear travel stage, such as a Thorlabs NF2AP50 stage, to adjust its distance from lens 902, thus adjusting the divergence of beam 903. Also, the laser diode 903 can be replaced with other types of single mode or multi-mode laser diodes or LEDS. Multiple tubes 7 that contain transmit optics can also be used to increase output light power.

In another embodiment, the scan in the flowchart of FIG. 4 performed by the two optical transceivers 61 and 62 to find the signal when the photodiode current is below threshold can include the following steps:

(i) The shafts of servomotors 1 and 2 are set initially to a pre-determined angular position, so that each optical transceiver approximately faces the other. The initial pre-determined angular position can either be stored in the memory of the controller, or it can be received from the network, or it can be set manually by an operator, or it can be calculated from Global Positioning System (GPS) coordinates input to the controller from a GPS receiver, such as an Atmel ATR0630 connected to the controller 209, of the two optical transceivers. An electronic compass, such as a Dinsmore 1525 connected to a National Semiconductor ADC0801 that is connected to the controller 209, can also be used to assist with initial positioning. In general, the optical transceiver can include any number of position awareness means for locating its position within a pre-determined reference frame.

(ii) The shafts 802 and 805 of servomotors 801 and 804 are then stepped by the controller through a pre-determined number of angular positions. For example, initially the shafts are set to a 45-degree angle with respect to their zero position. Then shaft 802 is rotated one degree every 2 seconds from its initial position up to the 125-degree position, while shaft 805 is kept stationary. Then shaft 805 is advanced 1 degree, and shaft 802 performs another sweep from 45 to 125 degrees, and so on until shaft 805 has also completed its sweep range.

(iii) Simultaneously but independently of the movement of shafts 802 and 805, linear stage 26 is continuously stepped through its range of available positions. The time that it takes for stage 26 to step through all its positions should be equal to or less than a predetermined value, in this example 2 seconds.

(iv) If at any time an incoming alignment frame is detected, then the next outgoing alignment frame transmitted by the optical transceiver will include the position of the motors of the optical transceiver followed by the position of the motors of the remote optical transceiver as reported in the last incoming alignment frame. Also, the position of linear stage 26 is fixed to the position it has at the time the incoming alignment frame is received.

(v) If the detected incoming frame has information on the position of the motors of this optical transceiver then the scan stops, and the motors are set to the values contained in the incoming frame (vi) If an incoming alignment frame has not been detected since the beginning of the scan, the outgoing alignment frames do not contain any information on the position of the motors of the other optical transceiver, i.e. the corresponding data fields of the outgoing frame are left blank.

(vii) If at the end of the scan no incoming frames have been detected, then the scan is repeated.

I claim:

1. A free space optics link including a first and a second free space optics apparatuses wherein said first free space apparatus comprising: a light source including at least an emitting portion, emitting a first light beam into free space, attached to a first actuated mechanical assembly with at least two degrees of freedom; a first photodetector including at least a receiving portion attached to a second actuated mechanical assembly, with at least two degrees of freedom, that can adjust the position of the photodetector receiving portion independently of the position of the light source emitting portion; a controller that can step said first actuated mechanical assembly through a range of positions and can adjust the position of the light source emitting portion to a position indicated by incoming alignment information received from the second free space optics apparatus, by controlling said first actuated mechanical assembly, and can step said second actuated mechanical assembly through a range of positions, independently of the movement of the first actuated mechanical assembly, and can adjust the position of the photodetector receiving portion, independently of the position of the light source emitting portion, to a position indicated by response values generated by said first photodetector due to incoming alignment signals received from the second free space optics apparatus, by controlling said second actuated mechanical assembly.

2. The link of claim 1 wherein the controller of the first free space apparatus transmits outgoing alignment information that include information indicative of the position of the light source emitting portion.

3. The link of claim 2 wherein the incoming alignment information include feedback position information indicative of the position of the light source emitting portion, and the controller adjusts the position of the light source emitting portion to a position indicated by the feedback position information.

4. The link of claim 2 wherein the outgoing alignment information conditionally include at least a portion of the incoming alignment information depending on the alignment history of the first free space optics apparatus.

5. The link of claim 2 wherein the outgoing alignment information includes response values of the first photodetector and said second free space optics apparatus includes a second photodetector and the incoming alignment signals include response values of the second photodetector and the controller adjusts the position of the light source emitting portion, independently of the position of the photodetector receiving portion, to maximize the response values of the second photodetector.

6. The link of claim 1 wherein the light source emitting portion is an optical fiber.

7. The link of claim 1 wherein the first photodetector receiving portion is an optical fiber.

8. The link of claim 1 wherein said first free space optics apparatus further includes a plurality of photodetectors.

9. The link of claim 1 wherein said first free space optics apparatus further includes a plurality of light sources.

10. The link of claim 1 wherein said first free space optics apparatus further includes an optical filter.

11. The link of claim 1 wherein said controller includes at least one logic IC selected from the group consisting of FPGA, ASIC, DSP, and CPU.

12. The link of claim 2 wherein said outgoing alignment information is contained in at least one frame of a communication protocol selected from the group consisting of Ethernet, SONET and ATM.

13. The link of claim 1 wherein said first free space optics apparatus further includes a radio receiver connected to said controller that can receive remote control commands to control the position of said first actuated mechanical assembly and the position of said second actuated mechanical assembly, independently of the position of the first mechanical assembly.

14. The link of claim 1 wherein said first free space optics apparatus further comprising position determining means connected to said controller for determining the position of said first free space optics apparatus within a predetermined reference frame, including at least one device selected from the group consisting of a GPS receiver and an electronic compass.

15. The link of claim 14 wherein said controller further transmits position information of said free space optics apparatus within said predetermined reference frame obtained from said position determining means.

16. The link of claim 1 wherein said controller transmits alignment information in response to a request for such information by a network device.

17. The link of claim 1 wherein said first actuated mechanical assembly can further adjust the position of the light source emitting portion independently of the position of the photodetector receiving portion and the controller can further adjust the position of the light source emitting portion independently of the position of the photodetector receiving portion.

18. A method of aligning a first free space optics device with a second free space optics device, one placed opposite to the other and each including a light source that includes at least an emitting portion, emitting a light beam into free space, attached to a first actuated mechanical assembly with at least two degrees of freedom and a photodetector including at least a receiving portion attached to a second actuated mechanical assembly, with at least two degrees of freedom, that can adjust the position of the photodetector receiving portion independently from the position of the light source emitting portion, and a controller that can control the first and second actuated mechanical assemblies, comprising the steps of:

(i) in each device the controller adjusting the position of the light source emitting portion by stepping the first actuated mechanical assembly through a number of positions, (ii) in each device the controller adjusting the position of the photodetector receiving portion by stepping the second actuated mechanical assembly through a number of positions, independently of the movement of the first actuated mechanical assembly, (iii) in each device the controller fixing the position of the second actuated mechanical assembly after incoming alignment signals are received, (iv) in each device the controller transmitting alignment frames including position data for the first actuated mechanical assembly and including position data for the first actuated mechanical assembly of the opposite free space optics device after incoming alignment frames have being received from the opposite free space optics device, and (v) in each device the controller fixing the position of the first actuated mechanical assembly to a position indicated by feedback position data included in an incoming alignment frame from the opposite device.

19. A method of aligning a first free space optics device with a second free space optics device, one placed opposite to the other and each including a light source that includes at least an emitting portion, emitting a light beam into free space, attached to a first actuated mechanical assembly with at least two degrees of freedom and a photodetector including at least a receiving portion attached to a second actuated mechanical assembly, with at least two degrees of freedom, that can adjust the position of the photodetector receiving portion independently from the position of the light source emitting portion, and a controller that can control the first and second actuated mechanical assemblies, comprising the steps of:
   (i) in each device the controller adjusting the position of the light source emitting portion by stepping the first actuated mechanical assembly through a number of positions,
   (ii) in each device the controller adjusting the position of the photodetector receiving portion by stepping the second actuated mechanical assembly through a number of positions, independently of the positions of the first actuated mechanical assembly,
   (iii) in each device the controller fixing the position of the second actuated mechanical assembly to a position indicated by response values generated by the photodetector due to the incoming alignment signals,
   (iv) in each device the controller transmitting alignment frames that include outgoing representative information of the alignment state of the device, and
   (v) in each device the controller fixing the position of the first actuated mechanical assembly to a position indicated by incoming representative information of the alignment state of the opposite free space device, included in an incoming alignment frame.

20. The method of claim 19 wherein in each device the outgoing representative information is the response values of the photodetector of the device and said incoming representative information is the response values of the photodetector of the opposite free space optics device.

* * * * *